United States Patent
Trivedi (10) Patent No.: US 7,486,738 B2
(45) Date of Patent: Feb. 3, 2009

(54) APPARATUS AND METHOD FOR REDUCING THE CREST FACTOR OF SINGLE CARRIER OR MULTI-CARRIER SIGNALS

(75) Inventor: Akshaya A. Trivedi, Santa Clara, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 581 days.

(21) Appl. No.: 11/326,100

(22) Filed: Jan. 5, 2006

(65) Prior Publication Data

US 2006/0176969 A1 Aug. 10, 2006

Related U.S. Application Data

(60) Provisional application No. 60/651,848, filed on Feb. 10, 2005.

(51) Int. Cl.
*H04K 1/10* (2006.01)

(52) U.S. Cl. .................................. 375/260; 370/206

(58) Field of Classification Search ............... 375/260, 375/295; 370/206, 209–210
See application file for complete search history.

(56) References Cited

U.S. PATENT DOCUMENTS

2004/0264595 A1* 12/2004 Kim .......................... 375/296
2005/0141408 A1* 6/2005 Anvari ....................... 370/206

* cited by examiner

*Primary Examiner*—Emmanuel Bayard (57) ABSTRACT

An apparatus for reducing the crest factor of a multi-carrier transmission system. The apparatus comprises a plurality of single carrier crest factor reduction circuits. Each of the single carrier crest factor reduction circuits receives a selected one of a plurality of single carrier signals and generates a crest factor reduced (CFR) single carrier signal. The apparatus also comprises an up-converter for up-converting each of the CFR single carrier signals to a selected frequency and combining the up-converted CFR single carrier signals to thereby produce a multi-carrier signal. The apparatus further comprises a first multi-carrier crest factor reduction circuit for receiving the multi-carrier signal and generating a first crest factor reduced (CFR) multi-carrier signal.

27 Claims, 4 Drawing Sheets

APPARATUS AND METHOD FOR REDUCING THE CREST FACTOR OF SINGLE CARRIER OR MULTI-CARRIER SIGNALS

CROSS-REFERENCE TO RELATED APPLICATION AND CLAIM OF PRIORITY

The present application is related to U.S. Provisional Patent No. 60/651,848, filed Feb. 10, 2005, entitled "Method To Reduce The Crest Factor Of Single Or Multi-Carrier Signals". U.S. Provisional Patent No. 60/651,848 is assigned to the assignee of the present application and is hereby incorporated by reference into the present disclosure as if fully set forth herein. The present application hereby claims priority under 35 U.S.C. §119(e) to U.S. Provisional Patent No. 60/651,848.

TECHNICAL FIELD OF THE INVENTION

This disclosure relates generally to communication systems and, more specifically, to a technique for reducing the crest factor or peak-to-average power ratio (PAPR) of single carrier and multi-carrier signals.

BACKGROUND OF THE INVENTION

Orthogonal frequency division multiplexing (OFDM) is a multi-carrier transmission technique in which a user transmits on many orthogonal frequencies (or sub-carriers). The orthogonal sub-carriers are individually modulated and separated in frequency such that they do not interfere with one another. This provides high spectral efficiency and resistance to multipath effects. An orthogonal frequency division multiple access (OFDMA) system allows some sub-carriers to be assigned to different users, rather than to a single user. Today, OFDM and OFDMA technology are used in both wireline transmission systems, such as asymmetric digital subscriber line (ADSL), and wireless transmission systems, such as IEEE-802.11a/g (i.e., WiFi) and IEEE-802.16 (e.g., WiMAX). This technology is also used for wireless digital audio and video broadcasting.

Code division multiple access (CDMA) is a single carrier transmission technique in which multiple users transmit in the same frequency band using different codes. CDMA technology is also widely used in both wireline and wireless applications, such as IS-95 and IS-2000 cellular networks.

Conventional power amplifiers for amplifying multi-carrier signals are relatively expensive parts of a communication system. A key design parameter for OFDM, OFDMA and CDMA power amplifiers is the requirement to minimize the generation of adjacent channel power (ACP) noise. ACP noise results from signal distortion caused by operation of power amplifier components in non-linear regions of the input-output characteristic such as when the power amplifier enters saturation. This distortion produces undesired spectral components in adjacent transmission channels.

Power amplifiers are more linear at lower input signal levels. Large input signals tend to drive a power amplifier into saturation. Thus, weaker signals experience less distortion and have lower ACP noise. However, a sudden large signal peak still results in distortion and ACP noise. This is especially problematic in systems that have large peak-to-average power ratios (i.e., high crest factors), such as OFDM, OFDMA and CDMA systems. To avoid this, power amplifiers often operate in "back-off" mode (i.e., reduced input signal) in order to accommodate large signal peaks. However, operating in back-off mode requires the use of devices with higher power ratings which adds to system design, development and manufacturing costs. Furthermore, it may be inefficient and may generate excessive heat.

Therefore, there is a need for improved OFDM, OFDMA and CDMA transmission system that minimize amplifier peak-to-average power ratio (PAPR) or crest factor without suffering performance degradation.

SUMMARY OF THE INVENTION

An apparatus is provided for reducing the crest factor of a multi-carrier transmission system. In one embodiment, the apparatus comprises a plurality of single carrier crest factor reduction circuits, wherein each of the plurality of single carrier crest factor reduction circuits capable of receiving a selected one of a plurality of single carrier signals and generating a crest factor reduced (CFR) single carrier signal. The apparatus also comprises an up-converter capable of up-converting each of the CFR single carrier signals generated by the plurality of single carrier crest factor reduction circuits to a selected frequency and combining the up-converted CFR single carrier signals to thereby produce a multi-carrier signal. The apparatus further comprises a first multi-carrier crest factor reduction circuit capable of receiving the multi-carrier signal and generating a first crest factor reduced (CFR) multi-carrier signal.

In another embodiment of the present disclosure, a method is provided for reducing the crest factor of a multi-carrier transmission system. The method comprises the steps of: i) receiving a plurality of single carrier signals; ii) applying a selected amount of crest factor reduction to each of the single carrier signals to thereby produce a plurality of crest factor reduced (CFR) single carrier signals; iii) up-converting each of the CFR single carrier signals to selected frequencies; iv) combining the up-converted CFR single carrier signals to thereby produce a multi-carrier signal; and v) applying a selected amount of crest factor reduction to the multi-carrier signal to thereby produce a first crest factor reduced (CFR) multi-carrier signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

A transmission technique is disclosed for reducing the peak-to-average power (PAPR) ratio—or crest factor—of the transmitted waveforms for multi-carrier signals, such as orthogonal frequency division multiplexing (OFDM) or orthogonal frequency division multiple access (OFDMA) signals, and for single carrier signals, such as code division multiple access (CDMA) signals. Crest factor reduction (CFR) provides improved power amplifier efficiency, reduced heat dissipation requirements, smaller heat sinks, lower system volume, reduced power supply load, and lower cost for wireless base stations.

The disclosed crest factor reduction (CFR) circuits implement optimally designed time-domain filters to additively cancel out peaks in the waveform. Since many digital communication systems use complex signals having a real part and an imaginary part, the crest factor reduction (CFR) circuits are designed to maintain the phase of the waveform at the peak and in the peak neighborhood. The length of the filters determine the error-vector-magnitude (EVM) and the ACP of the resulting waveform. The longer the peak canceling filter is, the lower is the ACP, but the greater is the EVM. The shorter the peak canceling filter is, the lower is the EVM, but greater is the ACP.

Figure 1:
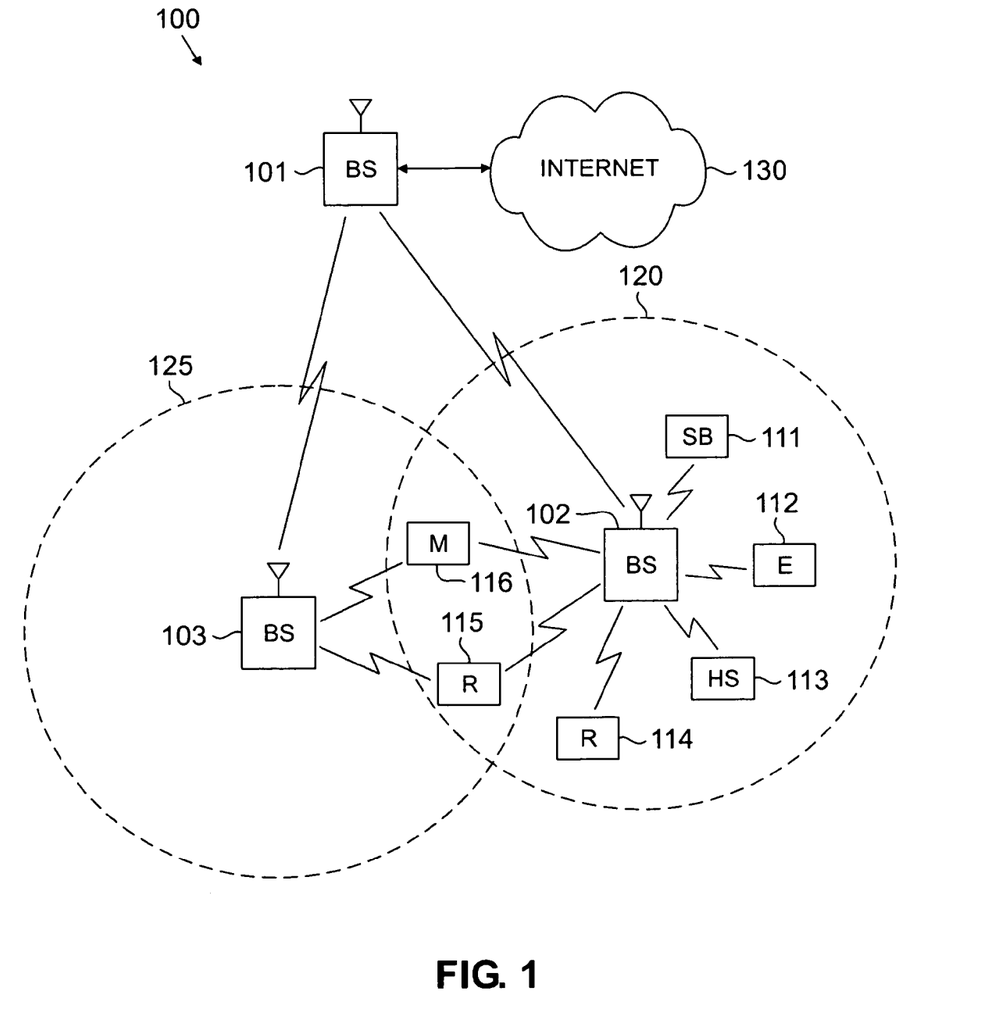
FIG. 1 illustrates an exemplary wireless network that reduces the peak-to-average power ratio (PAPR) or crest factor of OFDM, OFDMA or CDMA signals according to the principles of the present disclosure.

FIG. 1 illustrates exemplary wireless network 100, which reduces the crest factor or peak-to-average power ratio (PAPR) of single carrier and multi-carrier signals, such as OFDM, OFDMA and CDMA signals, according to the principles of the present disclosure. In the illustrated embodiment, wireless network 100 includes base station (BS) 101, base station (BS) 102, and base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM, OFDMA or CDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
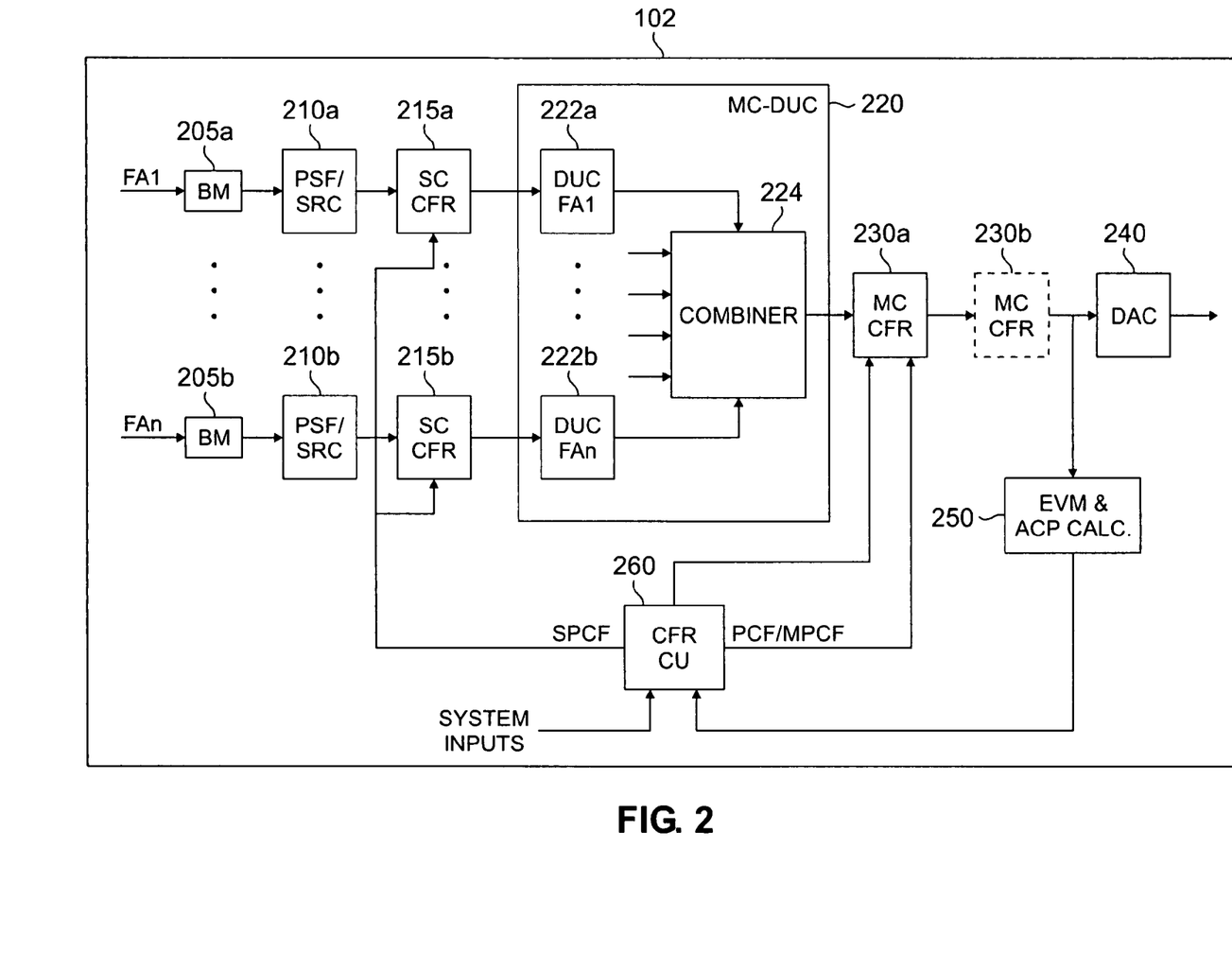
FIG. 2 illustrates selected portions of an exemplary base station that reduces the PAPR or crest factor of OFDM, OFDMA or CDMA signals according to one embodiment of the present disclosure.

FIG. 2 illustrates base station 102, which reduces the crest factor or peak-to-average power ratio (PAPR) of single carrier and multi-carrier signals, such as OFDM, OFDMA, and CDMA signals, according to the principles of the present disclosure. Base station 102 is illustrated by way of example only. Base stations 101 and 103 are substantially similar to base station 102 and need not be illustrated and described separately. Additionally, one or more of subscriber stations 111-116 may also reduce the crest factor or peak-to-average power ratio (PAPR) of single carrier or multi-carrier signals, such as OFDM, OFDMA and CDMA signals, according to the principles of the present disclosure. However, for the sake of simplicity and clarity, only base station 102 will be discussed in detail hereafter, except where otherwise noted.

According to an exemplary embodiment, base station 102 comprises a plurality of baseband modems (BMs) 205, including exemplary baseband modems 205a and 205b, a plurality of pulse shaping filters (PSFs) 210 (or sample rate converters (SRCs) 210), including exemplary PSF/SRC blocks 210a and 210b, and a plurality of single carrier (SC) crest factor reduction (CFR) circuits 215, including exemplary SC CFR circuits 215a and 215b. Base station 102 further comprises a plurality of digital up-converters (DUCs) 222, including exemplary DUC 222a and DUC 222b, and combiner 224. The plurality of digital up-converters 222 and combiner 224 may be implemented as a single multi-carrier (MC) digital up-converter (DUC) 220. Base station 102 further comprises one or more multi-carrier (MC) crest factor reduction (CFR) circuits 230, including exemplary MC CFR circuits 230a and optional MC CFR circuits 230b, digital-to-analog converter (DAC) 240, EVM and ACP calculation block 250, and crest factor reduction (CFR) control unit (CU) 260.

The baseband unit (i.e., baseband modems 205 or equivalent waveform generators) generates the waveforms to be transmitted. Each baseband unit generates a waveform for a single carrier. By way of example, BM 205a generates a waveform for the first carrier or frequency assignment, FA1, and BM 205b generates a waveform for the Nth carrier or frequency assignment, FAn.

The PAPR or crest factor for even a single carrier may be high in an OFDM, OFDMA, or CDMA system. In multi-carrier systems, single carrier waveform signals are taken to their respective frequencies and combined to form one multi-carrier signal. Hence, the PAPR or crest factor after combining becomes even higher. According to the principles of the present disclosure, peak cancellation (or crest factor reduction) may be done on the individual carriers by SC CFR circuits 215 and then may be done on the multi-carrier combined waveform by MC CFR circuits 230. This is preferable because selective control is achieved for each individual carrier.

In most multi-carrier systems, each baseband unit generates complex waveform data at a sample rate, F. By way of example, F may equal 10 MHz. PSF/SRC blocks 210 then over-samples each carrier by an over-sampling factor, $O_S$. Again by way of example, O may be equal to 12, such that each output of PSF/SRC blocks 210 has a data rate of $F_S=O_S\times F=120$ MHz. Four (4) single carriers (FA1, FA2, FA3, FA4), each having 10 MHz bandwidth, combine to form one multi-carrier signal with a bandwidth of 4×10=40 MHz. In some embodiments, PSF/SRC blocks 210 may be implemented as part of the baseband unit (i.e., as parts of baseband modems 205), in which case the outputs of the baseband modems 205 would be $F_S=120$ MHz.

According to an exemplary embodiment, each of the single carrier waveforms from the outputs of PSF/SRC blocks 210 may undergo crest factor reduction (CFR) in SC CFR circuits 215. This operation may be referred to as "single carrier crest factor reduction (SCCFR)." CFR control unit 260 decides if the SCCFR operation is implemented. If SCCFR operation is implemented, CFR control unit 260 provides single carrier peak cancellation filter constants (SPCF) to the filters in each of SC CFR circuits 215. If SCCFR operation is not implemented, then SC CFR circuits 215 operate as pass-through devices.

The advantage of SCCFR operation is that selective control of each carrier is achieved. Thus, each carrier may undergo crest factor reduction based on the system inputs provided to CFR control unit 260. For example, one carrier (or FA) may undergo crest factor reduction that is X dB more than another carrier undergoes. Also, because each carrier may undergo some crest factor reduction in SC CFR circuits 215, the crest factor of the combined multi-carrier waveform is relatively lower. Consequently, SC CFR circuits 215 may ease some of the processing requirements on multi-carrier CFR (MC CFR) circuits 230.

To combine the individual carriers, each carrier is up-converted to the correct frequency by one of digital up-converters 222. Combiner 224 then combines the up-converted single carriers to produce a multi-carrier signal or waveform. As noted, the process of digital up-conversion and combining may be aggregated into a single block called MC-DUC 220 (multi-carrier DUC) 220. A single DUC is a subset of the MC-DUC.

The combined multi-carrier waveform generated by combiner 224 then undergoes crest factor reduction in at least one multi-carrier crest factor reduction (MC CFR) circuit 230. After crest factor reduction is done on the output of combiner 224, the resulting waveform exhibits lower crest factor or peak-to-average power ratio (PAPR). The resulting waveform generated by MC CFR circuit(s) 230 is then applied to the input of DAC 240. Crest factor reduction (CFR) analysis may be performed on the output of MC CFR circuit(s) 230 by computing the error-vector magnitude (EVM) and/or the ACP in EVM and ACP calculation block 250. This analysis determines whether the system meets specifications that may be defined by standards.

The CFR analysis data may be used intelligently by CFR control unit 260. Based on the users and the load on the system, the single carrier and/or multi-carrier waveforms may exhibit patterns over a given time period. CFR control unit 260 may use the EVM and ACP values calculated by EVM and ACP calculation block 250 to dynamically change one or more of the CFR parameters. For example, CFR control unit 260 may use different SPCF constants for each carrier. CFR control unit 260 also may dynamically change the length of each filter.

For example, for a given baseline filter of length L, CFR control unit 260 may zero out the two (2) extreme taps at each end of a symmetric filter. This changes the length of the filter to (L−4). Changing the filter length in this manner may decrease EVM at the cost of increased ACP. However, this is acceptable as long as the system requirements are not violated. A similar dynamic allocation may be performed on the multi-carrier peak cancellation filter (MPCF) constants for MC CFR circuits 230. CFR control unit 260 may eliminate the SC CFR circuit 215 stage for any given carrier by forcing the SC CFR circuit 215 stage to operate as a pass-through device. CFR control unit 260 also may add one or more MC CFR circuits 230b in series with MC CFR circuit 230a. CFR control unit 260 determines these parameters based on the system inputs CFR control unit 260 receives.

The algorithm performed by MC CFR circuits 230 and SC CFR circuits 215 are substantially similar, since SC CFR is a subset of MC CFR. The length of the multi-carrier peak cancellation filter (MPCF) in MC CFR circuit 230 is assumed to be (2L+1). If the MPCF is symmetric, there would be L samples to the left of the center tap (index=−L) and L samples to the right of the center tap (index=+L). The index, C, of the center tap is then zero. The target PAPR for the system is assumed to be T dB with a probability of P. This means that any sample that has energy greater than T dB must undergo CFR. If the energy, E, of a sample, S, is E>T, then the energy at the sample S must be reduced by (E−T) dB.

It is assumed that the peak sample point of the MPCF corresponds to the center sample C with energy A dB. For simplicity, it is further assumed that A=1. Thus, the MPCF is scaled by a factor μ, such that the energy of C is (E−T) dB. Once this scaling is applied to the MCPF, the energy of sample S can be reduced to T by subtracting the waveform with the appropriately scaled MPCF at point S. If S is a complex sample, α+iβ, then μ is further scaled by $\gamma=(\alpha+i\beta)/(\alpha^2+\beta^2)^{1/2}$.

In summary, a sample point C of the MPCF is scaled by a factor μγ. Scaling by μ brings the energy of sample S down to T and scaling by γ maintains the phase at the sample point S after crest factor reduction (CFR). It must be noted that performing CFR at sample point S affects L samples before sample S and L samples after sample S. Thus, a tapped delay line of length (2L+1) is designed to hold the input data.

Figure 3:
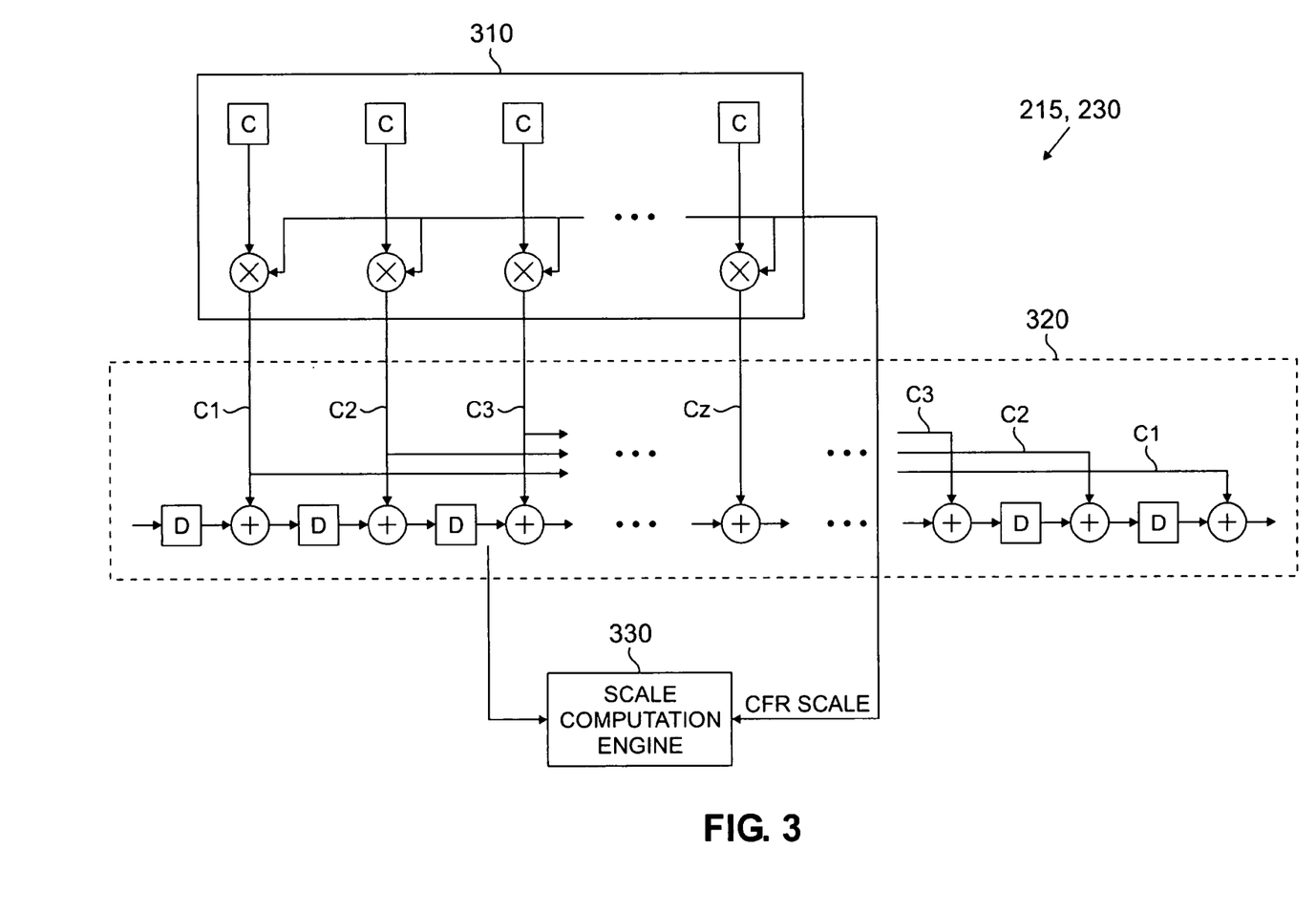
FIG. 3 illustrates in greater detail the crest factor reduction engine in the single carrier crest factor reduction (SC CFR) circuits and in the multi-carrier crest factor reduction (MC CFR) circuits according to one embodiment of the present disclosure.

FIG. 3 illustrates in greater detail the crest factor reduction engine in SC CFR circuits 215 and MC CFR circuits 230 according to one embodiment of the present disclosure. The crest factor reduction engine comprises symmetric peak cancellation filter (PCF) 310, tapped adder and delay line 320, and scale computation engine (SCE) 330. Tapped adder and delay line 320 comprises a chain of alternating delay elements (D) and adders (+). Each delay element receives the output of a preceding adder in the chain and feeds the input of a following adder in the chain. Each adder receives two inputs: i) the output of a preceding delay element and ii) a scaled constant from symmetric peak cancellation filter 310. Each adder outputs a sum to a following delay element in the chain.

Peak cancellation filter 310 receives a plurality of SPCF constants, Ci, from CFR control unit 260. Peak cancellation filter 310 comprises a plurality of multipliers (X) that scale the constants by a CFR Scale value that is received from SCE 330. The scaled constants are fed into the taps of tapped adder and delay line 320. Scale computation engine (SCE) 330 computes the complex scale of the baseline PCF. In the case of a symmetric PCF with (2L+1) taps, only (L+1) coefficient taps need to be scaled by exploiting the symmetry. By way of example, a first scaled constant, C1, is applied to the first adder tap and the last adder tap of tapped adder and delay line 320. Similarly, a second scaled constant, C2, is applied to the second adder tap and the second-to-last adder tap, a third scaled constant, C3, is applied to the third adder tap and the third-to-last adder tap, and so-forth.

The crest factor reduction engine provides flexibility by allowing SCE 330 to receive its input from the outputs of different delay elements or adders in tapped adder and delay line 320. In FIG. 3, only one delay element output is fed into SCE 330 for purposes of simplicity and clarity. However, in an alternate embodiment, a switch or multiplexer may be used to couple the input of SCE 330 to multiple tap points in tapped adder and delay line 320. This is beneficial if SCE 330 needs a varying number of cycles to compute the CFR Scale factor. For example, the SCE 330 may have a pipelined implementation of adders, multipliers, and the like. If SCE 330 takes M cycles to compute the CFR Scale factor in order to cancel the peak at sample S, then it is necessary to begin computing CFR Scale factor M cycles earlier than S. This requires tapping different data points along tapped adder and delay line 320.

Figure 4:
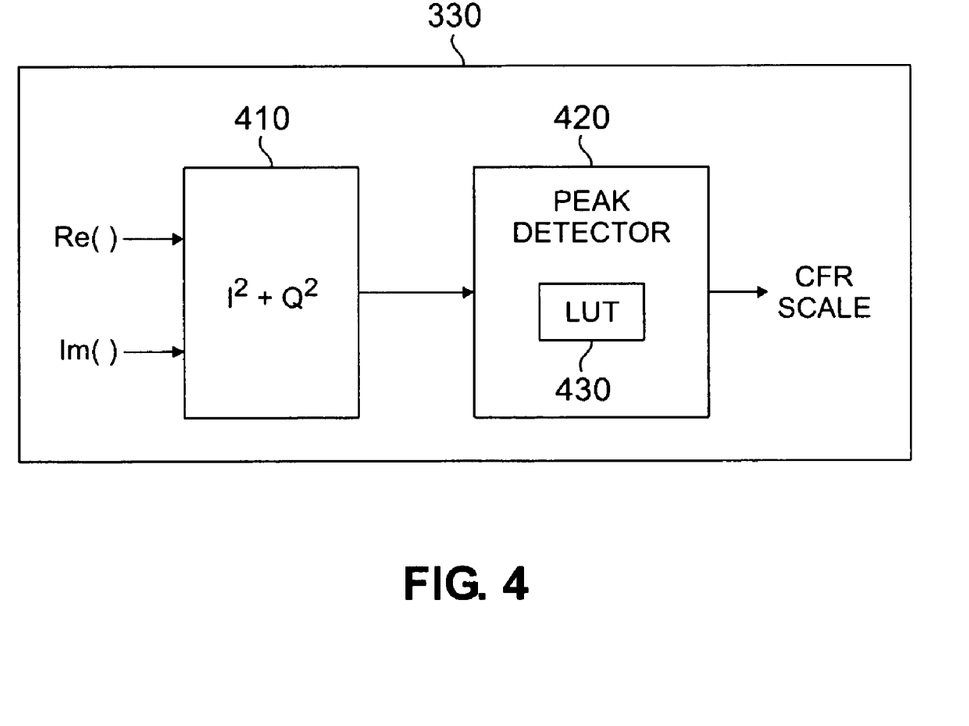
FIG. 4 illustrates the scale computation engine in the crest factor reduction engine according to one embodiment of the present disclosure.

FIG. 4 illustrates scale computation engine (SCE) 330 in the crest factor reduction engine according to one embodiment of the present disclosure. SCE 330 comprises power calculation block 410 and peak detector 420. Power calculation block 410 receives the real and imaginary components, Re( ) and Im( ), of each sample and calculates the sum of the squares of the I and Q values. The power ($I^2+Q^2$) values are then applied to the input of peak detector 420, which calculates the CFR Scale factor.

SCE 330 may use complex implementations (divide, magnitude computation, phase computation) to compute the scale or use engineering approximations. In an exemplary embodiment, Look-Up-Table (LUT) 430 may be used to efficiently calculate (i.e., look-up) the CFR Scale factor for a given power magnitude. In such an embodiment, scaled sample energy (SSE) may be used to address LUT 430. LUT 430 may be designed so that the bottom entry corresponds to the target PAPR value and the top entry corresponds to a maximum possible magnitude value.

For example, in a system where the maximum possible PAPR of a sample is 13 dB and the target CFR PAPR is 7 dB, the bottom entry would hold the CFR Scale factor corresponding to 7 dB and the top entry would hold the CFR Scale factor corresponding to 13 dB. The energy for any given sample is always greater than or equal to zero (i.e., it cannot be negative) and LUT 430 is indexed with a positive address. Thus, sample values that have PAPR less than the target PAPR (e.g., 7 dB) would have a negative entry into LUT 430. Based on this fact, a unique peak detection algorithm is implemented based on the address into LUT 430. A baseline SSE (BSSE) is computed apriori based on the target PAPR. If the computed SSE for a given sample is less than the BSSE, crest factor reduction (CFR) is not performed.

Reducing the energy of sample S affects L samples to the left of sample S and L samples to the right of sample S. Thus, it is possible that an increase in energy may occur in some of other 2L samples in tapped adder and delay line 320. This phenomenon is called "peak re-growth." The probability of this happening is relatively low. Also, if the maximum peak-to-average in a signal is, for example, 13 dB, then following MC CFR circuit 230a, the maximum peak-to-average of the signal would be the target PAR value, T dB, plus a small re-growth amount, typically around less than 0.5 dB. Thus, optional MC CFR circuit 230b may be introduced after MC CFR circuit 230a. In the new stage of MC CFR circuit 230b, the required LUT 430 may be quite small. In MC CFR circuit 230a, LUT 430 covered the range from 7 dB to 13 dB. In the new MC CFR circuit 230b, LUT 430 would cover the range from 7 dB to 7.5 DB. Both of these LUTs 430 are reconfigured by CFR control unit 260 based on the system input.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for reducing the crest factor of a multi-carrier transmission system comprising:
    a plurality of single carrier crest factor reduction circuits, each of the plurality of single carrier crest factor reduction circuits capable of receiving a selected one of a plurality of single carrier signals and generating a crest factor reduced (CFR) single carrier signal;
    an up-converter capable of up-converting each of the CFR single carrier signals generated by the plurality of single carrier crest factor reduction circuits to a selected frequency and combining the up-converted CFR single carrier signals to thereby produce a multi-carrier signal; and
    a first multi-carrier crest factor reduction circuit capable of receiving the multi-carrier signal and generating a first crest factor reduced (CFR) multi-carrier signal.

2. The apparatus as set forth in claim 1, further comprising a control unit for controlling the plurality of single carrier crest factor reduction circuits such that each of the plurality of single carrier crest factor reduction circuits applies an individually selected amount of crest factor reduction.

3. The apparatus as set forth in claim 2, wherein the control unit is capable of causing a first single carrier crest factor reduction circuit to apply a first amount of crest factor reduction to a first single carrier signal and causing a second single carrier crest factor reduction circuit to apply a second amount of crest factor reduction to a second single carrier signal.

4. The apparatus as set forth in claim 3, wherein the first amount of crest factor reduction is different than the second amount of crest factor reduction.

5. The apparatus as set forth in claim 3, wherein the control unit is further capable of causing at least one of the plurality of single carrier crest factor reduction circuits to operate as a pass-through device.

6. The apparatus as set forth in claim 2, further comprising a second multi-carrier crest factor reduction circuit capable of receiving the first crest factor reduced (CFR) multi-carrier signal and generating a second crest factor reduced (CFR) multi-carrier signal.

7. The apparatus as set forth in claim 6, wherein the control unit is capable of causing the first multi-carrier crest factor reduction circuit to apply a first amount of crest factor reduction and causing the second multi-carrier crest factor reduction circuit to apply a second amount of crest factor reduction, wherein the first amount of crest factor reduction is different than the second amount of crest factor reduction.

8. The apparatus as set forth in claim 1, wherein at least one of the plurality of single carrier crest factor reduction circuits and the first multi-carrier crest factor reduction circuit comprises:
- a tapped adder and delay line comprising a chain of alternating tapped adders and delay elements;
- a peak cancellation filter capable of generating scaled coefficients that are applied to the tap inputs of the tapped adders; and
- a scale computation engine capable of determining a scale factor used by the peak cancellation filter.

9. The apparatus as set forth in claim 1, further comprising a baseband unit capable of generating the plurality of single carrier signals.

10. The apparatus as set forth in claim 1, wherein the apparatus is implemented in a mobile station capable of accessing a wireless network.

11. The apparatus as set forth in claim 1, wherein the apparatus is implemented in a base station of a wireless network.

12. A wireless network base station comprising:
- a transmitter capable of transmitting a multi-carrier signal to subscriber stations in a wireless network; and
- an apparatus associated with the transmitter for reducing the crest factor of the multi-carrier signal comprising:
  - a plurality of single carrier crest factor reduction circuits, each of the plurality of single carrier crest factor reduction circuits capable of receiving a selected one of a plurality of single carrier signals and generating a crest factor reduced (CFR) single carrier signal;
  - an up-converter capable of up-converting each of the CFR single carrier signals generated by the plurality of single carrier crest factor reduction circuits to a selected frequency and combining the up-converted CFR single carrier signals to thereby produce a multi-carrier signal; and
  - a first multi-carrier crest factor reduction circuit capable of receiving the multi-carrier signal and generating a first crest factor reduced (CFR) multi-carrier signal.

13. The wireless network base station as set forth in claim 12, further comprising a control unit for controlling the plurality of single carrier crest factor reduction circuits such that each of the plurality of single carrier crest factor reduction circuits applies an individually selected amount of crest factor reduction.

14. The wireless network base station as set forth in claim 13, wherein the control unit is capable of causing a first single carrier crest factor reduction circuit to apply a first amount of crest factor reduction to a first single carrier signal and causing a second single carrier crest factor reduction circuit to apply a second amount of crest factor reduction to a second single carrier signal.

15. The wireless network base station as set forth in claim 14, wherein the first amount of crest factor reduction is different than the second amount of crest factor reduction.

16. The wireless network base station as set forth in claim 14, wherein the control unit is further capable of causing at least one of the plurality of single carrier crest factor reduction circuits to operate as a pass-through device.

17. The wireless network base station as set forth in claim 13, further comprising a second multi-carrier crest factor reduction circuit capable of receiving the first crest factor reduced (CFR) multi-carrier signal and generating a second crest factor reduced (CFR) multi-carrier signal.

18. The wireless network base station as set forth in claim 17, wherein the control unit is capable of causing the first multi-carrier crest factor reduction circuit to apply a first amount of crest factor reduction and causing the second multi-carrier crest factor reduction circuit to apply a second amount of crest factor reduction, wherein the first amount of crest factor reduction is different than the second amount of crest factor reduction.

19. The wireless network base station as set forth in claim 12, wherein at least one of the plurality of single carrier crest factor reduction circuits and the first multi-carrier crest factor reduction circuit comprises:
- a tapped adder and delay line comprising a chain of alternating tapped adders and delay elements;
- a peak cancellation filter capable of generating scaled coefficients that are applied to the tap inputs of the tapped adders; and
- a scale computation engine capable of determining a scale factor used by the peak cancellation filter.

20. The wireless network base station as set forth in claim 12, further comprising a baseband unit capable of generating the plurality of single carrier signals.

21. A subscriber station capable of communicating with a wireless network, the subscriber station comprising:
- a transmitter capable of transmitting multi-carrier signals to the wireless network; and
- an apparatus associated with the transmitter for reducing the crest factor of the multi-carrier signal comprising:
  - a plurality of single carrier crest factor reduction circuits, each of the plurality of single carrier crest factor reduction circuits capable of receiving a selected one of a plurality of single carrier signals and generating a crest factor reduced (CFR) single carrier signal;
  - an up-converter capable of up-converting each of the CFR single carrier signals generated by the plurality of single carrier crest factor reduction circuits to a selected frequency and combining the up-converted CFR single carrier signals to thereby produce a multi-carrier signal; and
  - a first multi-carrier crest factor reduction circuit capable of receiving the multi-carrier signal and generating a first crest factor reduced (CFR) multi-carrier signal.

22. A method for reducing the crest factor of a multi-carrier transmission system, the method comprising the steps of:
- receiving a plurality of single carrier signals;
- applying a selected amount of crest factor reduction to each of the single carrier signals to thereby produce a plurality of crest factor reduced (CFR) single carrier signals;
- up-converting each of the CFR single carrier signals to selected frequencies;
- combining the up-converted CFR single carrier signals to thereby produce a multi-carrier signal; and
- applying a selected amount of crest factor reduction to the multi-carrier signal to thereby produce a first crest factor reduced (CFR) multi-carrier signal.

23. The method as set forth in claim 22, wherein the plurality of single carrier signals comprises one of:

orthogonal frequency division multiplexing (OFDM) signals;
orthogonal frequency division multiple access (OFDMA) signals; and
code division multiple access (CDMA) signals.

24. The method as set forth in claim 22, wherein the step of applying applies a first amount of crest factor reduction to a first single carrier signal and applies a second amount of crest factor reduction to a second single carrier signal.

25. The method as set forth in claim 24, wherein the first amount of crest factor reduction is different than the second amount of crest factor reduction.

26. The method as set forth in claim 22, further comprising the step of applying a selected amount of crest factor reduction to the first crest factor reduced (CFR) multi-carrier signal to thereby produce a second crest factor reduced (CFR) multi-carrier signal.

27. The method as set forth in claim 26, wherein the selected amount of crest factor reduction applied to the first crest factor reduced (CFR) multi-carrier signal is different than the selected amount of crest factor reduction applied to the multi-carrier signal.

* * * * *